C. H. SCHOPBACH.

CORSET.

APPLICATION FILED NOV. 27, 1912.

Reissued Mar. 10, 1914. 13,698.

Witnesses:
Harry S. Gaither
Eugene C. Mann.

Inventor.
Charles H. Schopbach
by Poole & Ornier
Attys.

UNITED STATES PATENT OFFICE.

CHARLES H. SCHOPBACH, OF AURORA, ILLINOIS, ASSIGNOR TO INTERNATIONAL CORSET COMPANY, OF AURORA, ILLINOIS, A CORPORATION OF ILLINOIS.

CORSET.

13,698. Specification of Reissued Letters Patent. Reissued Mar. 10, 1914.

Original No. 1,035,481, dated August 13, 1912, Serial No. 644,841. Application for reissue filed November 27, 1912. Serial No. 733,921.

*To all whom it may concern:*

Be it known that I, CHARLES H. SCHOPBACH, a citizen of the United States, and a resident of Aurora, in the county of Kane and State of Illinois, have invented certain new and useful Improvements in Corsets; and I do hereby declare that the following is a full, clear, and exact description thereof, reference being had to the accompanying drawings, and to the letters of reference marked thereon, which form a part of this specification.

This invention relates to an improvement in corsets, and particularly to such corsets as are provided with a ventilating section applied either at the back, or in the case of a corset laced in front, at the front of the corset, or in both places. As illustrated herein, it is shown as applied to the back of a corset.

The invention consists of the matters hereinafter described and more particularly pointed out in the appended claims.

Figure 1:
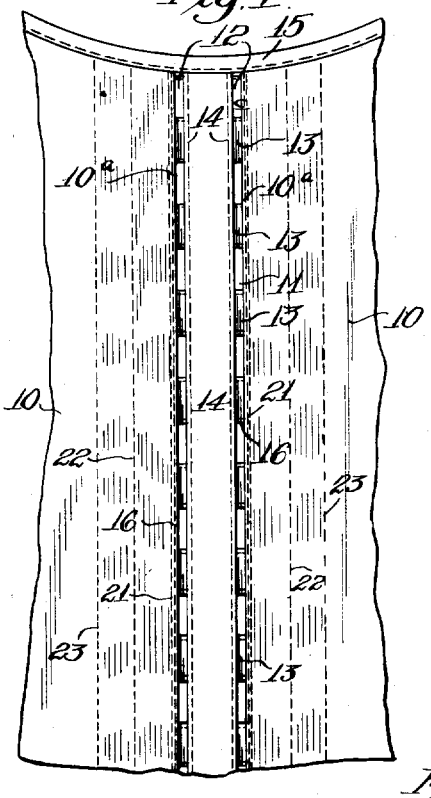
Figure 2:
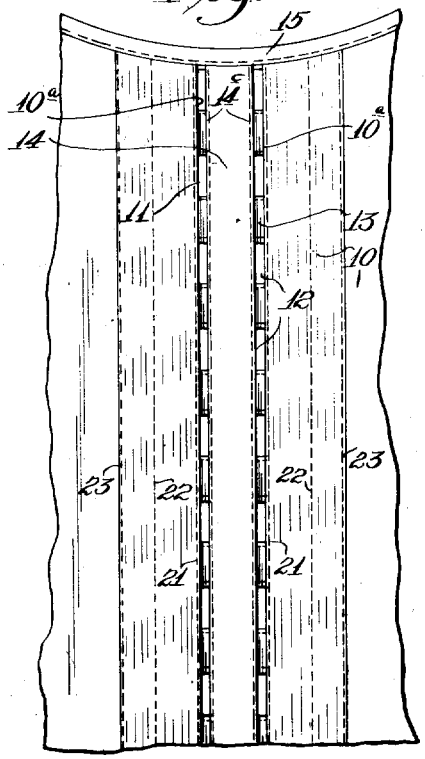
Figure 3:
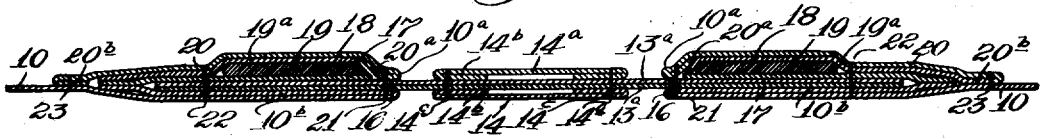
Figure 4:
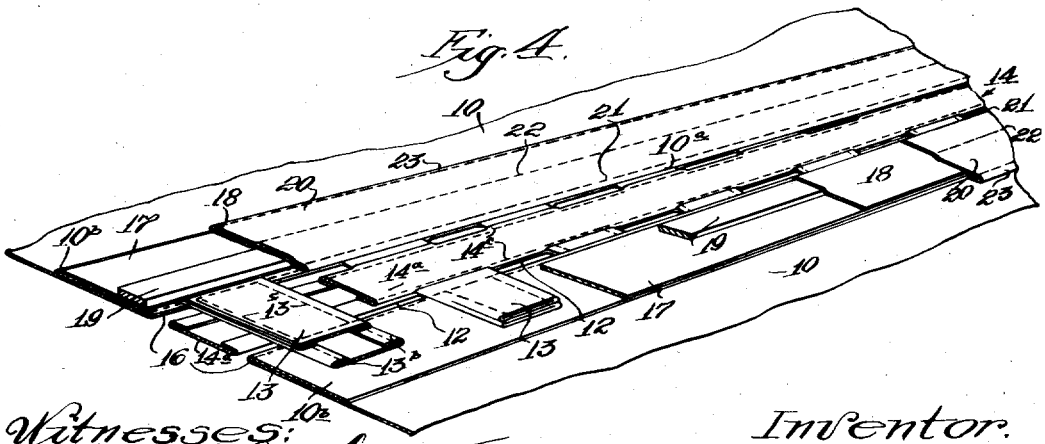

In the drawings,—Figure 1 is a view representing in elevation the upper portion of the back part of a corset body provided with my improved ventilating section; Fig. 2 is a view representing in elevation the inner face of the part of the corset body as shown in Fig. 1; Fig. 3 is a view representing a cross-section through Fig. 1 on the line 3—3 thereof, said section being shown on an exaggerated scale; Fig. 4 is a perspective view of a part of the back of the corset showing some of the parts removed to illustrate the construction and manner of attachment of the ventilating section.

Referring now to that embodiment of my invention illustrated in the drawings, 10, 10 indicate the two sections of a corset body which, in this case, has the lacing (not shown) applied in front. 11 indicates a ventilating section attached to and forming the connection between the margins $10^a$, $10^a$, of said body sections at the back of the corset, which margins are separated by a space extending vertically of the corset body from the top to the bottom thereof and occupied by the ventilating section. The ventilating section is in the form of a lattice work and comprises a plurality of parallel, horizontal, spaced members 13, and a vertically extending member 14 which is located between the margins $10^a$ of the body sections and which intersects said horizontal members, thus providing a plurality of vertically separated open spaces 12 at each side of the vertical member, between the lateral margins of said member and the margins of body sections. The horizontal members 13 of the ventilating section have their ends extended beyond the margins of the body sections and are attached to said body sections while the vertical member 14 is attached to each of the horizontal members 13 where it intersects them, and is attached at its top to the binding strip 15 applied to the top margin of the corset body.

The horizontal members of the ventilating section each consists of two superposed strips $13^a$, $13^a$, of soft flexible material, each strip being turned in upon itself along its lateral edges to form reinforcing hems $13^b$. Said strips are secured together by a line of stitching $13^c$ extending parallel with and adjacent to each lateral margin thereof.

The vertical member 14 of the lattice work consists of two superposed strips $14^a$, $14^a$, located on opposite sides of the horizontal members 13 which extend between them, and each strip being doubled over along its lateral edges to form hems $14^b$ which are arranged facing the said horizontal members. A line of stitching $14^c$ extending parallel to and adjacent to each lateral margin of the vertical member 14, secures the strips $14^a$, $14^a$, comprising said member, to each other and to the horizontal members 13 where they cross said horizontal members.

Each body section 10 consists of a single ply or thickness of soft flexible material, except near its margin, where it has a part $10^b$ bent back upon itself to provide a double thickness of material. The end parts of the horizontal members 13 of the lattice work lie next to and in contact with this doubled over part $10^b$ of the body section and terminate short of its free vertically extending margin. A line of stitching 16 extending parallel to and adjacent to the margin $10^a$ of each body section secures said body sections to the horizontal members 13 of the lattice work.

17 and 18 indicate reinforcing or wear strips made of crinoline or the like, placed next to the inner surfaces of the horizontal members 13 of the lattice work, said wear strips extending vertically of the corset body and having their margins at one side closely adjacent to the margin $10^a$ of the body section, and their margins at the other side extended beyond the ends of the horizontal members of the lattice work so as to be conterminous with the free margin of the doubled over part $10^b$ of the body section. Between said wear strips is to be inserted a stiffening member 19 of whale-bone or the like. 20 indicates a pocket-forming strip extending vertically of the corset body. Said pocket-forming strip is turned in at its lateral margins to form hems $20^a$, $20^b$. One lateral margin of said strip, namely, the one provided with the hem $20^a$ is conterminous with the margin $10^a$ of the body section, while the other lateral margin, namely the one with the hem $20^b$ projects laterally beyond the free margin of the doubled over part of the body section.

A line of stitching 21 located adjacent to and parallel to the margin $10^a$ of the body section and within the line of stitching 16 secures the pocket-forming member 20 to the body section and also to the horizontal members 13 of the lattice work where they are crossed by it. Thus at the margins of the body sections said horizontal members of the lattice work are secured to the body section at its margin by two lines of stitching. The line of stitching 21 defines the side of the pocket $19^a$ for the stiffening member 19 adjacent the margin of the body section. A line of stitching 22 located about midway between the lateral edges of the pocket-forming strip 20 defines the side of the pocket $19^a$ for the stiffening member 19 remote from the margin of the body section and secures together said pocket-forming strip, the wear strips 17, 18, the horizontal members 13 of the lattice work and the double thickness of the body section 10.

A line of stitching 23 extending along the margin of the pocket-forming strip 20 remote from the margin $10^a$ of the body section secures said strip to the corset body along a line parallel to and spaced from the pocket $19^a$ containing the stiffening member.

By the construction described, it is possible to attach a ventilating section to a corset body which is of a single thickness except at its marginal part in such manner as to produce a strong and durable connection. In addition, the attachment of the pocket-forming strip to the single thickness of the corset body along a line spaced from the line of stitching defining the inner side of the pocket for the stiffening member, largely increases the strength and durability of the connection in that the pull tending to separate the parts is not applied directly along the line of stitching defining the inner side of said pocket, that is to say, adjacent to the edge of the stiffening member.

I claim as my invention—

1. In a corset, the combination of two body sections thereof, each formed of a single thickness of material, vertically spaced, horizontal members, stiffening strips extending along the adjacent margins of said body sections, and pocket forming strips, each of which is substantially wider than its associated stiffening strip, and is attached to the material of the associated section by three laterally separated lines of stitching; the first and second lines of stitching being located at opposite sides of the said associated stiffening strip and the third line of stitching extending along the edge of the pocket forming strip remote from the margin of the body section; the said horizontal members extending at their inner ends between the pocket forming strip and the material of the section, across the stiffening strip, and being engaged by both lines of stitching at the sides of said stiffening strip, and said members terminating at their ends between the said second and third lines of stitching.

2. In a corset, the combination of two body sections thereof, each formed of a single thickness of material, a ventilating section consisting of a vertically extending member and horizontal members stitched to said vertical member, stiffening strips extending along the adjacent margins of said body sections, and pocket forming strips, each of which is substantially wider than its associated stiffening strip, and is attached to the material of the associated section by three laterally separated lines of stitching; the first and second lines of stitching being located at opposite sides of the said associated stiffening strip and the third line of stitching extending along the edge of the pocket forming strip remote from the margin of the body section; the said horizontal members of the ventilating section extending at their inner ends between the pocket forming strip and the material of the section, across the stiffening strip, and being engaged by both lines of stitching at the sides of said stiffening strip, and said members terminating at their ends between the said second and third lines of stitching.

In testimony that I, CHARLES H. SCHOPBACH, claim the foregoing as my own invention I affix my own signature in the presence of two witnesses, this twenty-third day of November, A. D. 1912.

CHARLES H. SCHOPBACH.

Witnesses:

MARSHALL B. GARDNER,

EMIL SCHOPBACH.